United States Patent
Harkness et al.

[19]

[11] Patent Number: 5,930,321
[45] Date of Patent: Jul. 27, 1999

[54] HEAD ASSEMBLY

[75] Inventors: Alexander Whitecross Harkness, Gibsonia; Michael Francis Hankinson, Monroeville, both of Pa.

[73] Assignee: CBS Corporation, Pittsburgh, Pa.

[21] Appl. No.: 09/056,143

[22] Filed: Apr. 7, 1998

Related U.S. Application Data

[63] Continuation-in-part of application No. 08/687,012, Jul. 16, 1996, Pat. No. 5,742,652.
[51] Int. Cl.⁶ .............................. G21C 11/00; G21C 15/00
[52] U.S. Cl. .......................... 376/298; 376/287; 376/263
[58] Field of Search .................................. 376/260, 263, 376/287, 298, 299

[56] References Cited

U.S. PATENT DOCUMENTS

| | | | |
|---|---|---|---|
| 4,302,290 | 11/1981 | Mazur et al. | 376/287 |
| 4,678,623 | 7/1987 | Malandra et al. | 376/260 |
| 4,828,789 | 5/1989 | Hankinson et al. | 376/287 |
| 4,830,814 | 5/1989 | Altman | 376/287 |
| 5,225,150 | 7/1993 | Malandra et al. | 376/263 |

FOREIGN PATENT DOCUMENTS 2100496  12/1982  United Kingdom.

*Primary Examiner*—Daniel D. Wasil

[57] ABSTRACT

An integrated head assembly for a nuclear reactor pressure vessel includes a closure head with CRDM assemblies extending upwardly from the head. A CRDM seismic support disposed above the closure head provides lateral support for the CRDM assemblies. The seismic support also has air flow holes which communicate with the interior of a shroud enclosing the CRDMs and extending upwardly from the closure head to the seismic support. The shroud has an air port in direct air flow communication with the surrounding atmosphere so that the closure head, shroud and seismic support define an air flow passageway directly communicating with the surrounding atmosphere via the air port and without the extensive ductwork and, therefore, with substantially less power. A missile shield disposed above and in air flow communication with the seismic support provides a lightweight, compact physical barrier for removing energy from dislocated objects such as CRDM drive rods.

9 Claims, 4 Drawing Sheets

HEAD ASSEMBLY

CROSS REFERENCE

This application is a continuation-in-part application of U.S. application Ser. No. 08/687,012 filed Jul. 16, 1996, now U.S Pat. No. 5,742,652, which issued Apr. 21, 1998.

BACKGROUND OF THE INVENTION

The invention relates to a head assembly for a nuclear reactor pressure vessel and more particularly to a simplified integrated head assembly including a missile shield disposed above control rod drive mechanisms operatively extending through the closure head of the pressure vessel.

Pressure vessels containing fuel assemblies in commercial pressurized water nuclear reactor facilities have control rods which are operated by control rod drive mechanism assemblies (CRDMs). The CRDMs are mechanically supported on a removable closure head bolted to the pressure vessel and laterally supported by a seismic support platform and vertically restrained by a missile shield. Missile shields are generally relatively large heavy concrete or metal structures designed to absorb kinetic energy from dislocated CRDMs or other objects originally attached to the reactor pressure vessel. In addition, the closure head must also mechanically support a complex ventilation system located above the closure head for providing a substantial, continuous flow of ambient containment air through the CRDM coil region. See, in this regard, FIG. 1 of U.S. Pat. No. 4,678,623 which shows a head arrangement found in many commercial facilities. Briefly, FIG. 1 shows a design wherein the surrounding ambient air below the seismic support platform 28 is drawn across the unbaffled upper portion of the CRDMs, downwardly along the baffled electromagnetic coils of the CRDMs, into a lower plenum 20, upwardly through ducts 22 into an upper plenum 24 and then exhausted by fans 26 into the surrounding atmosphere above the fans. By exhausting the air upwardly in this manner, the hot exhaust air from the CRDMs can be blown into the general containment atmosphere so that the walls of the refueling canal near the head of the reactor vessel are not be substantially heated. Concrete walls should not be exposed to temperatures of about 150° F. and are preferably not exposed to temperatures of more than 120° F. In addition to the ventilation system, and as is shown in FIG. 1 of U.S. Pat. No. 4,828,789, a closure head may also support a shield surrounding the CRDM assemblies for protecting maintenance workers from radioactive CRDM assemblies.

During refueling operations, the closure head, CRDM assemblies and their supporting subsystems, missile shield and other devices located over the closure head must be disassembled, lifted and removed so that the closure head can be removed and the spent fuel assemblies in the core of the pressure vessel below can be rearranged or replaced with fresh fuel assemblies. To reduce the time required to remove a closure head in order to refuel a nuclear reactor, an integrated head assembly was developed in the 1980s as a backfit for the design discussed above. As is shown in FIG. 2 of U.S. Pat. No. 4,678,623, the integrated head assembly replaced the ducts 22 extending from the lower plenum to the upper plenum with a duct arrangement 136, 138 and 140 which partially encircled the CRDMs.

In this type of arrangement, the surrounding ambient air below the seismic support 128 was drawn along the exposed upper portion of the CRDMs, downwardly past the baffled electromagnetic coils and into the lower plenum 120, upwardly through the ducts 136–140 into the upper plena 162, and then exhausted into the atmosphere by fans 126. Advantageously, this and other equipment was supported by the closure head during power operations and could be lifted as a unit from the closure head during refueling operations. See, also, U.S. Pat. No. 4,830,814 and UK Patent Application No. 2,100,496 which show another integrated head assembly design. While the integrated head assembly design introduced in the 1980s successfully provided its intended advantages quite well, it has proven to be difficult to backfit all of the associated assemblies and subassemblies in a radioactive, operating nuclear facility.

A natural convection ventilation design which could be more readily backfitted in an operating facility such as the reactor shown in FIG. 1 of U.S. Pat. No. 4,678,623 previously was proposed for cooling the CRDM coils without the need for any ventilation fans. It was determined in developing a natural convection ventilation design that the closure head arrangements employing the above described forced circulation type of ventilation systems utilized most of the fan power to draw the cooling air through the air ducts and utilized relatively little power to circulate the cooling air through the CRDM electromagnetic coil region.

This natural circulation design included a redesigned, taller cooling shroud to increase the natural draft and other features for reducing the air flow resistance through the head region. However, a finite element analysis of the natural circulation design indicated that natural convection could achieve only about one-fourth of the 48,000 cubic feet per minute (CFM) air flow required by the design. Calculations showed that such an arrangement could result in a peak coil surface temperatures of up to about 380° F. based upon a continuous stepping heat load estimate of 12 kw/CRDM. Although such conditions may be considered acceptable based on the peak specified allowable temperature of 392° F. at the coils, this design provides an assured temperature margin of only 32° F., which might require more frequent replacement of the coils after many years of operation at the increased temperatures.

Thus, the nuclear industry has not developed an entirely satisfactory integrated head assembly design which will substantially cool the CRDM assemblies, reduce refueling time and radiation exposure.

SUMMARY OF THE INVENTION

It is an object of the present invention to provide a practical head assembly design including a missile shield, which provides substantial cooling for the CRDM assemblies, including their electromagnetic coils, and reduced refueling time and radiation exposure. It is a further object to provide a design which can be backfit into commercial nuclear reactor facilities as well as employed in new construction.

With these objects in view, the present invention resides in an integrated head assembly which includes a pressure vessel closure head. A CRDM seismic support having air flow holes is disposed above the closure head with CRDMs extending upwardly from the closure head through the CRDM seismic support and between the air flow holes of the CRDM seismic support. A shroud enclosing the CRDMs extends upwardly from the closure head to the seismic support and is in air flow communication with the seismic support air flow holes. The shroud also has an air port, and preferably more than one air port, in direct air flow communication with the surrounding atmosphere. At least one ventilation fan (and preferably three or four fans) is disposed above the closure head and in air flow communication with the air flow passageway defined by the closure head, shroud and seismic support for circulating the air between the ambient atmosphere and the air flow passageway in order to cool the CRDMs in the head assembly. Also, a missile shield having air flow holes is disposed between the CRDM seismic support and the ventilation fan. Advantageously, large quantities of cooling air ventilate the head assembly to cool the CRDMs without unnecessarily wasting most of the fan power in air ducts during power operation. In addition, the entire head assembly can be lifted as a unit and transferred during refueling operations. Also, it has been estimated that this head assembly with its CRDM-encircling shroud can be installed in about one third the time required to install the head assembly shown in FIG. 2 of U.S. Pat. No. 4,678,623 so that there will be reduced exposure to radiation during installation and later during maintenance operations. Further, the integrated head assembly can be employed in new construction or readily backfitted in existing commercial facilities, including those facilities having integrated head assemblies from the 1980s, and may be used with existing lift devices.

In a preferred embodiment of the present invention the integrated head assembly includes a downdraft ventilating fan supported on a missile shield superjacent the CRDM seismic support for blowing atmospheric air downwardly over the CRDMs and then out through one or more air ports into the ambient atmosphere around the head assembly in a refueling canal. Advantageously, natural air circulation in the refueling canals of commercial facilities will circulate the air from the head assembly (at a temperature which could be up to about 160° F.) upwardly out of the refueling canals.

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED EMBODIMENT

Figure 1:
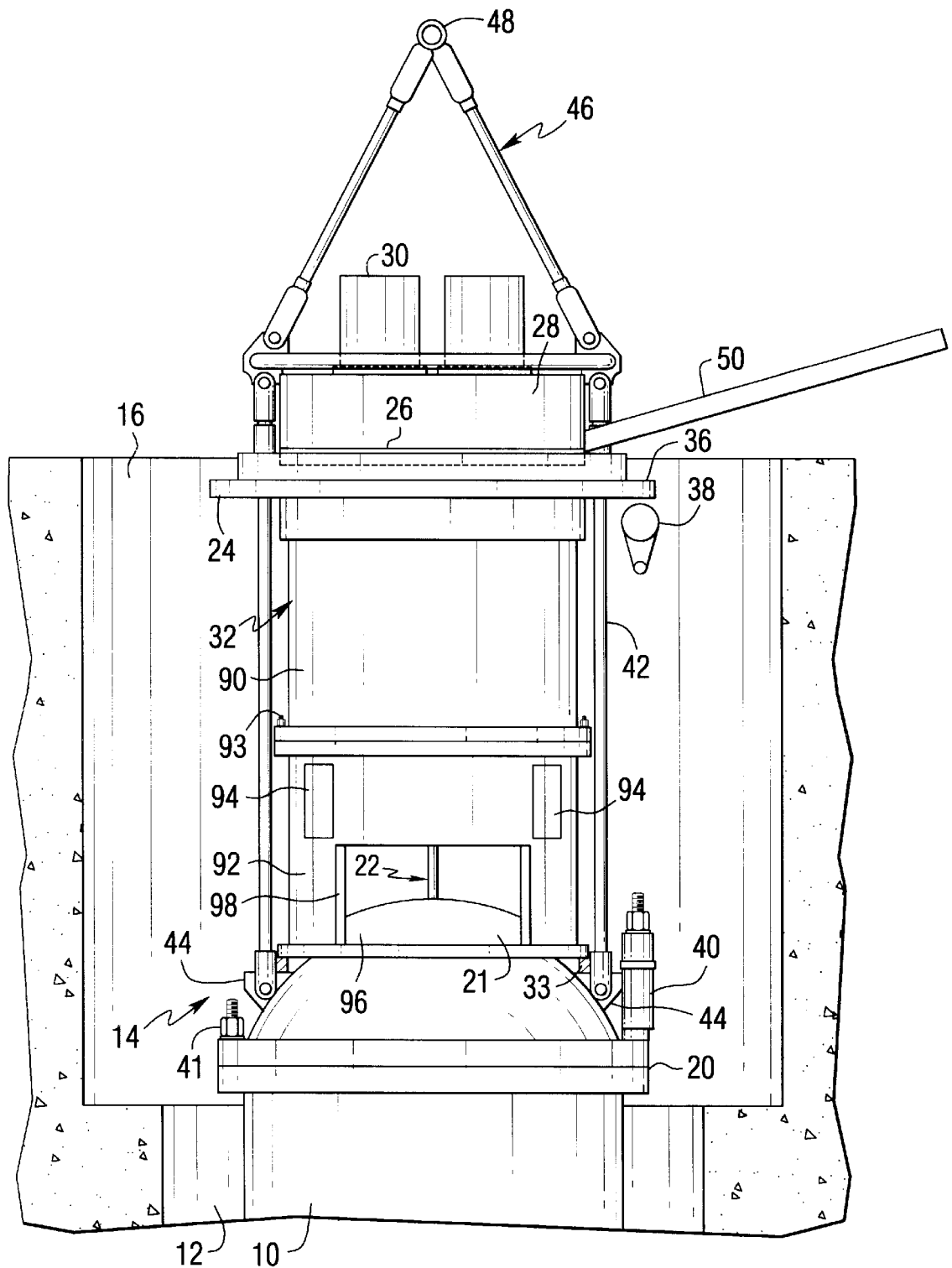
FIG. 1 is a schematic representation of a head assembly embodying the present invention.
Figure 3:
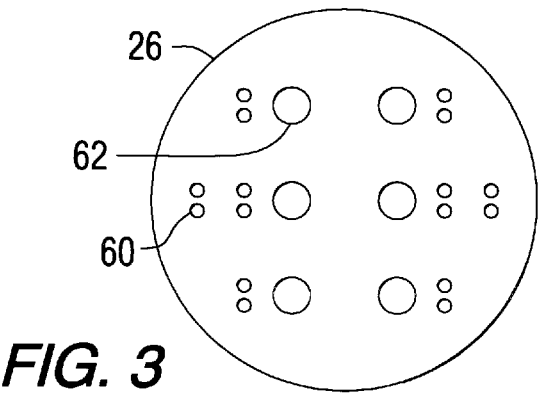
FIG. 3 is a schematic plan view of a missile shield shown in FIG. 1.

FIG. 1 shows a pressure vessel 10 in a reactor cavity 12 with an integrated head assembly 14 embodying the present invention extending upwardly in one end of a refueling canal 16. The head assembly 14 embodying the present invention may be employed in new construction or backfitted to replace any of the various head assemblies shown in the above identified patents. The previously mentioned U.S. Pat. No. 4,678,623 is hereby incorporated by this reference for its disclosure of the structure of reactor vessels and integrated head assemblies and their component parts. FIG. 1 generally shows a head assembly 14 as it would appear during power operation.

The preferred integrated head assembly 14 of FIG. 1 generally includes a reactor vessel closure head 20, CRDMs 22, a seismic support 24 to laterally support the CRDMs, a missile shield 26 for vertically restraining the CRDMs, one or more fan plena 28 and two or more ventilation fans 30 (either with one large plenum 28 distributing air from each fan 30 as is shown in FIG. 1 or with a smaller plenum 28 associated with each fan 30) and a shroud 32 surrounding the CRDMs. Importantly, the shroud 32 extends from the closure head 20 to the seismic support 24. As is shown, the shroud 32 may be supported by the closure head 20 via a support ring 33 or other suitable means. The fans 30 may include a spare in a commercial facility, in which case the fans 30 will have backdraft dampers.

As shown in FIG. 1, the closure head 20 is attached to the reactor vessel 10, covered with head insulation 21. As is shown, the seismic support 24 may have a circumferential track 36 supporting a movable hoist 38 for supporting a stud tensioner 40. The stud tensioner tensions and detensions the bolts 41 which seal the closure head 20 against the pressure vessel 10 during power operations at pressures of up to 2250 psi or more and temperatures of up to 650° F. or more. In addition, the seismic support 24 and the missile shield 26 are supported by lift rods 42 bolted to mounts 44 on the closure head 20. The lift rods 42 are an integral part of a lift rig 46. The lift rig 46 also has a lift eye 48 which may be engaged by an overhead crane (not shown) for removing and replacing the integrated head assembly 14 as a unit. A cable tray or bridge 50 may be attached to the missile shield 26 as shown in FIG. 1 for supporting CRDM cables, control rod position indicator cables, thermocouple lines and electrical lines. These cables and lines may be connected to the plant systems at a panel on the containment wall above the operating deck or at the pressure vessel. In situations where the available clearances may be too small, the cable tray 50 may be pivotally attached to the missile shield 26 or elsewhere to facilitate the transfer of the closure head 14 during refueling operations.

Figure 2:
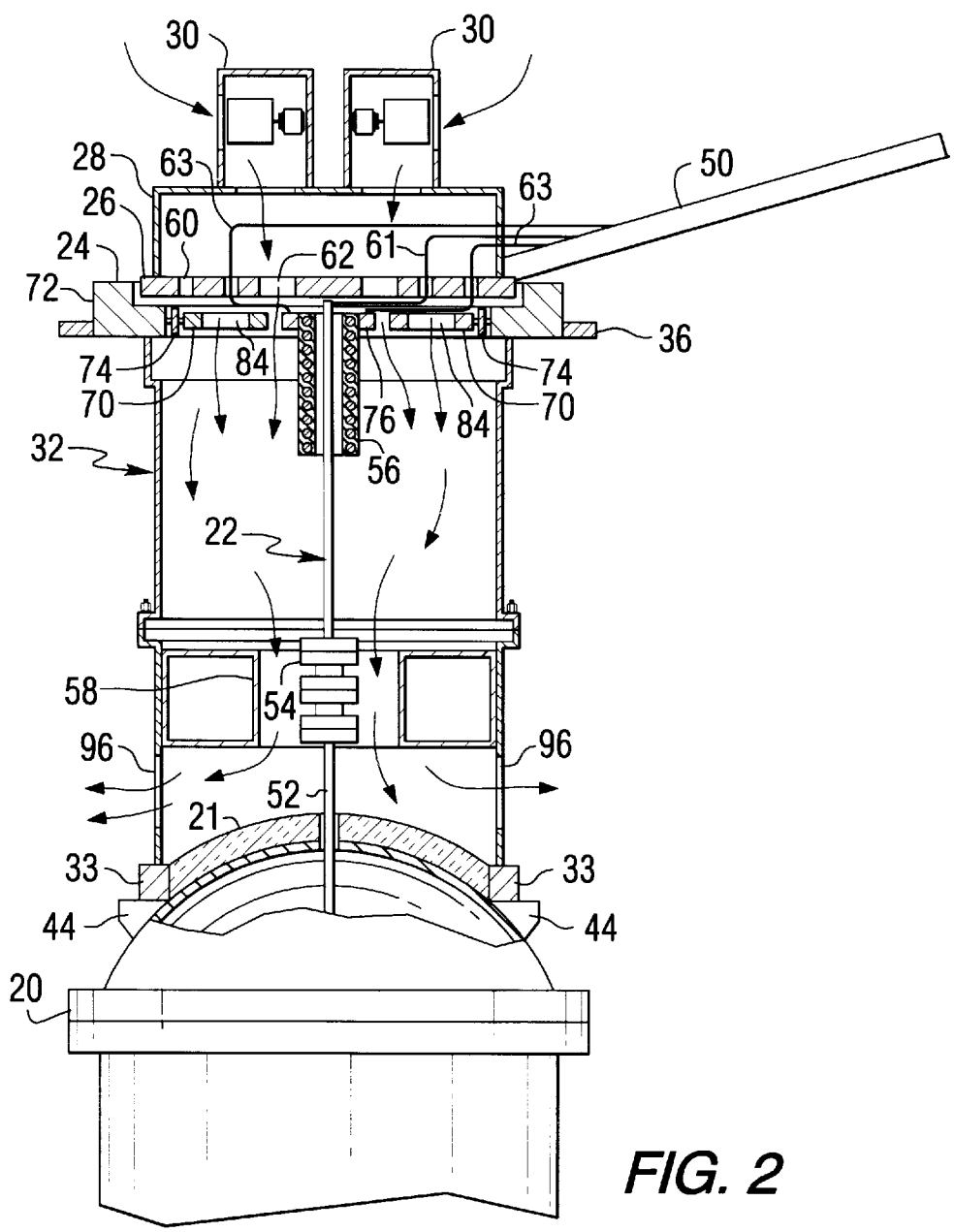
FIG. 2 is a schematic representation of a cross-section of the head assembly shown in FIG. 1.

FIG. 2 is a schematic cross-section of the head assembly 14 which shows a representative CRDM 22 as including a drive rod 52 and electromagnetic, coils 54, a RPI coil 56 and an air flow baffle 58 which surrounds the electromagnetic coils 54 of all of the CRDMs 22. When the facility is online and generating power, the CRDMs are raised to a position adjacent the underside of the missile shield 26 as shown in FIG. 2. As is shown in FIG. 2, the missile shield 26 has a plurality of holes 60 and relatively larger holes 62. The smaller holes 60 provide a passageway for the CRDM cables 61 from the below CRDMs 22 and cables 63 from the below RPI coils 56 to the cable tray 50 via the plenum 28 above. Thus, there may be up to 150 to 160 or more holes 60. These holes 60 also provide a passageway for ventilating air to pass. The larger holes 62 provide additional passageways for the flow of ventilating air. Preferably, the total area of the small and large holes is sufficient to provide an air flow velocity of less than about 30 feet/second, and more preferably less than about 20 feet/second, in order to reduce the pressure drop of the flowing air through the head assembly 14. Thus, a repeating hole pattern like that shown in FIG. 2 or similar patterns would be employed in a commercial facility for providing sufficient cable and air flow passageways.

The missile shield 26 is preferably superjacent to the seismic support 24 as shown in FIGS. 1 and 2 in order to reduce the momentum which a failed CRDM 22 might achieve. As is shown in FIG. 2, the seismic support 24 includes interlocking apertured RPI spacer plates 70 peripherally supported by a circumferential support ring 72 via several extendable nut assemblies 74. The interlocking spacer plates 70 are arranged so as to define passageways through which the CRDMs 22 and their cables 61 and the RPI coils 56 and their cables 63 extend. The RPRs 56 may have flanges 76 which may be laterally supported by the interlocking spacer plates 70.

Figure 4:
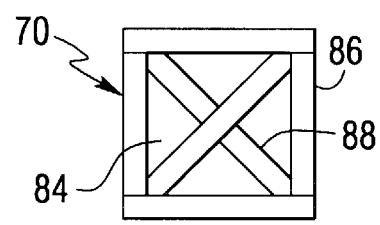
FIG. 4 is a schematic plan view of a rod position indicator (RPR) spacer plate, which is a component part of a seismic support shown in FIG. 1.

As may be best seen in FIG. 4, the apertured interlocking plates 56 have large air flow passageways 84. The plate as shown in FIG. 4 may be fabricated of welded frame members 86 of up to about one foot along each side or more which is supported by cross members 88. Preferably, the total area of the passageways 84 is sufficient to provide an air flow velocity through the support 24 of less than about 30 feet/second, and more preferably of less than about 20 feet/second, for reducing the pressure drop of the air as it flows through the seismic support 24.

The shroud 32 shown in FIGS. 1 and 2 generally includes an upper portion 90 flanged to a lower portion 92 which may be fastened together by bolts 93. In addition, each portion 90 or 92 may be fabricated of from one up to three or more sections. For example, each portion 90 or 92 could be fabricated of three 120° arcuate sections which are welded or otherwise suitably jointed together. The upper portion 90 is preferably about 0.75 inches thick. The lower portion 92 is preferably from about 0.75 inches to about 1.5 inches thick to provide integral gamma personnel shielding. In addition, the shroud 32 may have access doors 94 for inspecting thermocouple columns (not shown).

The shroud 32 shown in FIGS. 1 and 2 has one or more air ports 96 which may be covered with doors 98 which are normally open during power operations for exhausting the flowing air and may be closed during maintenance operations to protect maintenance personnel from radiation due to crud on the CRDMs. The air ports 96 are preferably located below the CRDM electromagnetic coils 54 and the baffles 58 which enclose them within the shroud. The air ports 96 may have a rectangular or other regular or irregular cross-section. Also, the air ports 96 may have different sizes. Thus, for example, air ports 96 facing the closely adjacent walls of the refueling canal may have six inches or wider openings and other air ports facing toward the more distant walls of the refueling canal may have twenty four inches or wider openings to control the relative flow of air. Preferably, the total cross-section of the air ports 96 is sufficient to maintain the flow of cooling air at a velocity of less than about 30 feet/second, and more preferably, less than about 10 feet/second in order to reduce the pressure drop and to prevent the exhausted air from flowing across the refueling canal 16 and heating the walls of the canal.

Advantageously, ambient air from the atmosphere of the containment above the fans 30 is blown downwardly long the entire length of the RPI coils 78 (of about twelve feet) shown in FIG. 2 and the baffled CRDM electromagnetic coils 54 and then out through the air ports 96 into the refueling canal 16. In addition, this air cools electrical cables and connectors as well. A comparison of the flow velocities in the RPI region of the present design with the prior art design shown by FIG. 1 of U.S. Pat. No. 4,678,623 indicated that the air flow velocities achieved in the RPI region by the present invention were at least 8 feet/second versus velocities achieved by the prior art design as low as 1 foot/second.

Preferably, the air flows out of the shroud 32 at a temperature of less than about 160° F., and more preferably less than about 150° F., in order to cool the head assembly 14 without excessively heating the walls of the refueling canal 16. Baffling (not shown) may be mounted to the reactor stud insulation to direct air flow into the refueling canal. Also, the doors 98 of the shroud 32 and the baffling mounted on the reactor stud insulation may be adjusted to allow as-installed flow tuning to assure that the correct flow profile is achieved. Advantageously, these adjustments also eliminate the need for costly pre-installation flow testing.

To evaluate the effects of exhausting air from the head assembly 14 into the refueling canal 16 and upon the walls of the refueling canal 16, a thermal-hydraulic finite element code was used to model the closure head 20, refueling canal 16 and containment. The code employed an axisymmetric modeling approximation with correct fan inlet air velocities and an equivalent inlet area for the axisymmetric model. It was determined that a thermal plume develops around the head assembly 14 which is clearly separated from the refueling cavity walls. This determination was based upon a 28 foot radius refueling cavity (which implies that the hot air from the shroud 32 is discharged toward the radially more distant containment wall portions) for simulating an average area available as a heat sink and upon an ambient atmosphere temperature of 120° F. This indicates that there is adequate surface area in the refueling canal to generate natural circulation of the atmosphere in order to remove the heat dumped from the head assembly into the refueling canal. In another run to evaluate the effect of the radially close sidewalls of the refueling cavity, finite element code was run on a design having very tight baffling which essentially pushed the heated air from the air ports 40 straight up. The thermal plume appeared to be compact enough that the wall temperature would remain about 120° F. Preferably, however, the air ports 40 will be baffled to direct the exhaust air away from the close sidewalls and into the wide sides of the canal over two arcs of about 80°.

This analysis also indicated that the present invention provides better circulation of the ambient air in the refueling canal 16 compared with the prior design shown in FIG. 1 of U.S. Pat. No. 4,678,623. The prior ventilation design was determined to provide air velocities in the canal in the range of from 0 to about 0.3 feet/second whereas the present invention was determined to provide velocities from the shroud of about 1 foot/second or more.

Advantageously, the head assembly 14 of FIG. 1 may be readily backfit to replace an arrangement such as that shown in FIG. 1 of U.S. Pat. No. 4,678,623. The large missile shield and cooling fans shown in this patent at FIG. 1 can be eliminated and replaced with more efficient devices. Existing lifting rigs may be retained without needing in-plant testing if the total weight be be lifted does not increase. No electrical cabling need be changed and routine disconnecting over the head may be eliminated if desired. Also, access for inspection of the head insulation and the head penetration area is improved.

In another embodiment, the fans 30 may be employed to draw air into the shroud 32 via the air ports 98 and then discharge the air above the head package 14. Like the first described embodiment, this design will require significantly less power than do the previously described designs. An additional advantage of this embodiment is that the relatively hot air is exhausted away from the refueling canal 16 and will not recirculate from the refueling canal. It is noted that auxiliary baffles may be installed on the shroud 32, seismic support 24 or missile shield 26 of the first described embodiment if recirculation is a concern.

In other embodiments, the fans 30 may located in the air ports 96 and the air circulated between the holes 60 and 62 of the missile shield 26 and the ambient atmosphere. However, the clearances are very tight and specially designed fans may be needed.

Figure 5:
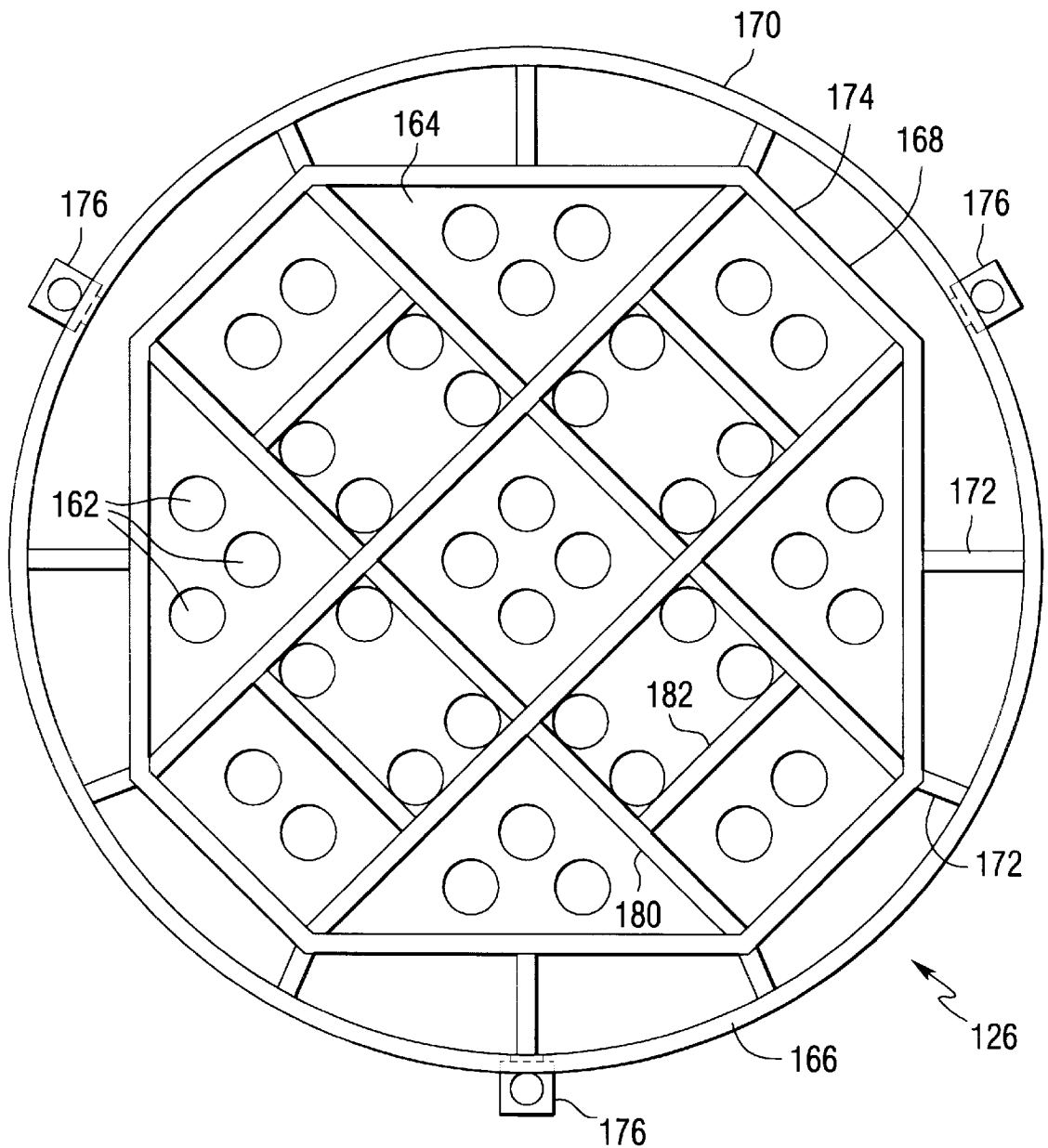
FIG. 5 is a schematic plan view of a preferred missile shield of the present invention.
Figure 6:
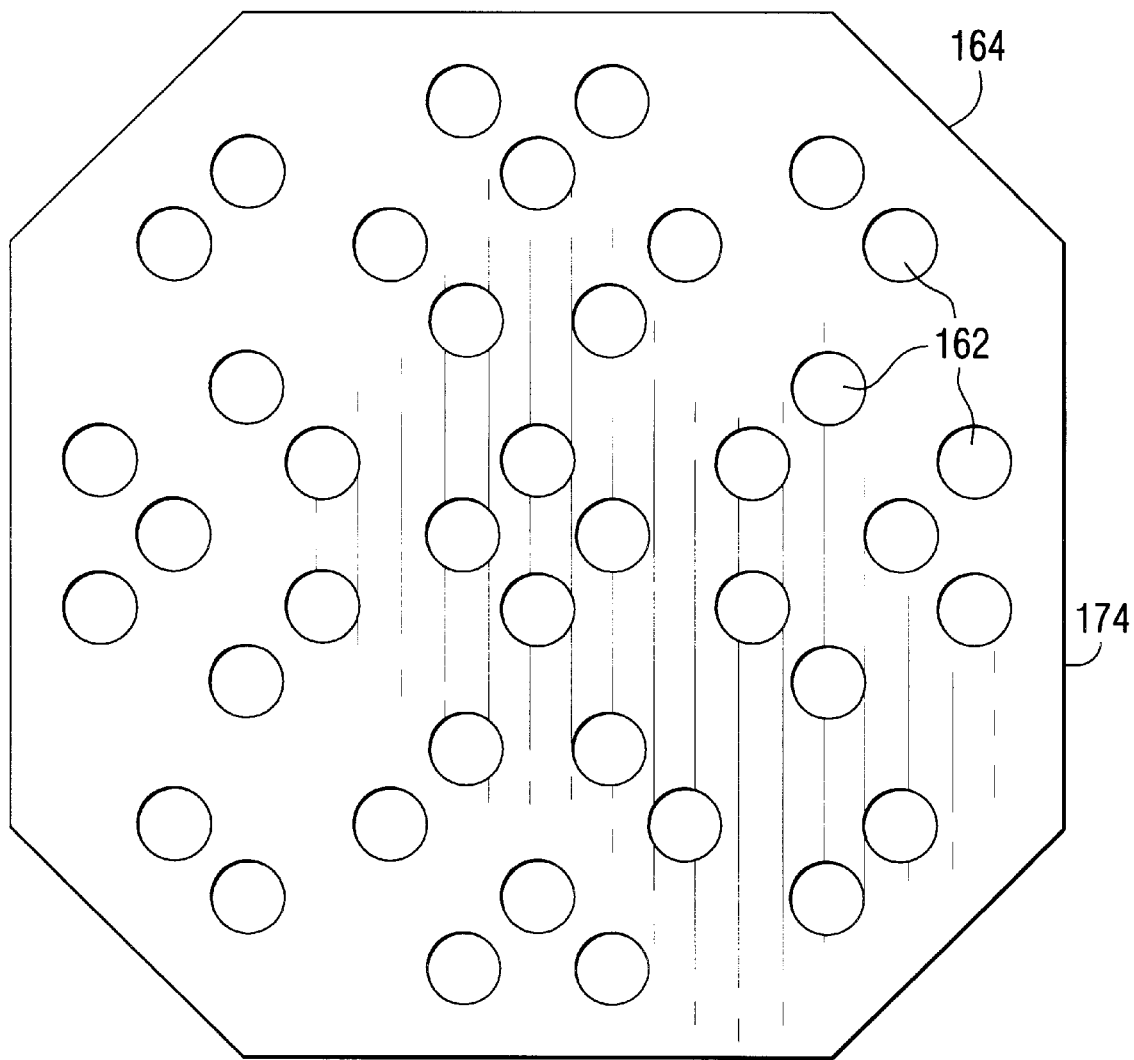
FIG. 6 is a schematic plan view of a horizontal plate member of the missile shield of FIG. 5.

FIGS. 5 and 6 show a preferred missile shield 126 having ventilation holes 162. (In this embodiment, the CRDM cables 61 and the RPI cables 63 of FIG. 2 extend generally horizontally through the space defined by the missile shield 126 and the spacer plates 70 from the CRDMs and RPI coils to the cable tray 50.) Advantageously, the illustrated missile shield 126 is flexible, light-weight and compact.

The missile shield 126 generally includes a generally horizontal steel plate 164 and a plurality of spaced structural supports 166 for the steel plate 164 such as steel beams welded thereto, including a closed (or endless) inner beam support 168 and a closed (or endless) outer beam support 170 spaced therefrom with interconnecting beam supports 172 extending between them. The interconnecting beam supports 172 may be bolted or welded to the inner and outer beam supports 168 and 170, respectively. Advantageously, the use of bolted connections between the interconnecting beam supports 172 and the outer beam support 170 facilitates installation. Also, the interconnecting beam supports 172 and/or the closed outer beam support 170 may be configured to fit with the seismic support 24 of FIG. 2.

The horizontal plate 164 preferably defines a polyhedron with a peripheral edge 174 which is sufficiently large to intercept a CRDM missile such as the shown octagon, but it may alternatively define a different polyhedron shape or a circle if other air flow patterns are desired. The outer beam support 170 spaced from the inner beam support 168 preferably defines a circle. As shown, the inner beam support 168 preferably is superjacent the periphery 174 of the horizontal plate 164 and the outer beam support 170 is radially beyond the periphery 174. Lift rod connections 176 are preferably welded or otherwise attached to the outer beam support 170 for receiving the lift rods 42 of FIG. 1. As shown, the lift rod connections 176 preferably are spaced circumferentially from the interconnecting supports 172, which provides flexibility to the missile shield 126 so that relatively large impact forces may be absorbed upon a CRDM strike (perhaps, plastically deforming the plate and nearby support beams welded thereto) while transmitting lesser forces to the lift rig and other members of the assembly. In addition, chord supports 180 extend inwardly from the inner beam support 168 together with cross supports 182 to form a plurality of closed or endless beam support structures within the inner beam structure 168 for isolating the impact of a missile strike. Advantageously, an effective missile shield plate 164 embodying the design of FIGS. 5 and 6 need only be about two inches thick so that most, if not all, existing cranes in commercial electric generating nuclear power plants will be capable of removing the integrated head assemblies.

While a present preferred embodiment of the present invention has been shown and described, it is to be understood that the invention may be otherwise variously embodied within the scope of the following claims of invention.

What is claimed is:

1. An integrated head assembly for a nuclear reactor pressure vessel, comprising:
   a pressure vessel closure head;
   a CRDM seismic support disposed above the closure head, the support having a plurality of air flow holes;
   a plurality of CRDM assemblies extending upwardly from the closure head through the CRDM seismic support between the air flow holes;
   a shroud enclosing the CRDMs and extending upwardly from the closure head to the seismic support in air flow communication with the seismic support air flow holes, the shroud having an air port in direct air flow communication with the surrounding atmosphere; whereby the closure head, shroud and seismic support define an air flow passageway directly communicating with the surrounding atmosphere via the air port;
   a ventilation fan disposed above the closure head in air flow communication with the air flow passageway; and
   a missile shield having air flow holes disposed between the CRDM seismic support and the ventilation fan.

2. The integrated head assembly of claim 1, wherein the assembly includes a lift rig attached with the missile shield and the pressure vessel closure head, and wherein the missile shield comprises a generally horizontal plate with a peripheral edge and lift rig connections disposed radially outwardly of the peripheral edge of the plate.

3. The integrated head assembly of claim 1, wherein the missile shield comprises a generally horizontal plate and beam supports welded to the plate, the beam supports including: a closed inner beam support and a closed outer beam support with interconnecting beams extending therebetween.

4. The integrated head assembly of claim 3, wherein the missile shield has lift rig connections circumferentially spaced from the interconnecting beams.

5. The integrated head assembly of claim 3, further comprising chord supports having ends extending inwardly from the closed inner beam support.

6. The integrated head assembly of claim 3, wherein the inner support defines a polyhedron and the outer support defines a circle.

7. The integrated head assembly of claim 3, wherein the generally horizontal plate has a peripheral edge and the outer closed beam support is radially outwardly spaced from the peripheral edge of the horizontal plate.

8. The integrated head assembly of claim 7, further comprising lift rig connections attached to the outer closed beam support.

9. The integrated head assembly of claim 8, wherein the interconnecting beams are bolted to the closed outer beam support.

* * * * *